United States Patent Office 3,629,220
Patented Dec. 21, 1971

3,629,220
HOMOPOLYMERIZATION OF VINYL CHLORIDE
WITH ACYL SULFONYL PEROXIDE INITIATOR
Jose Sanchez, Grand Island, N.Y., assignor to
Pennwalt Corporation
No Drawing. Filed June 9, 1969, Ser. No. 831,740
Int. Cl. C08f 1/62, 3/30
U.S. Cl. 260—92.8                              21 Claims

ABSTRACT OF THE DISCLOSURE

Vinyl chloride is polymerized at a temperature below about +20° C. to solid homopolymer, using an initiator system of acyl sulfonyl peroxide, certain amines and, optionally, reducing agent. Example: Suspension polymerization of vinyl chloride at 0° C. for 16 hours gave 95% conversion using acetyl t-butylsulfonyl peroxide, ascorbic acid, and N,N-dimethylaniline, in weight parts of 1/0.44/0.06 per 100 parts by weight of monomer. In the absence of ascorbic acid, an 82% conversion is obtained. The sulfonyl peroxide alone gives 30% conversion.

BACKGROUND OF THE INVENTION (1) Field of the invention

This invention relates to the homopolymerization of vinyl chloride monomer using acyl sulfonyl peroxide as initiator. More particularly, the invention relates to a lower temperature polymerization process giving high yields of solid homopolymer.

(2) Description of the prior art

Acyl sulfonyl peroxides have been used as initiator for the polymerization of vinyl chloride monomer at conventional temperatures, i.e., above about +30° C. The effectiveness of these peroxides drops sharply as the polymerization temperature falls toward 0° C. and lower.

British Patent No. 1,021,996 teaches polymerization or copolymerization of vinyl chloride at temperatures below about 0° C., in an organic liquid medium, preferably a lower alkanol, using an initiator system of acetyl cyclohexylsulfonyl peroxide, ascorbic acid, and ferrous sulfate.

OBJECTS OF THE INVENTION

The main object of the invention is a process for the polymerization of vinyl chloride at lower than conventional temperatures to obtain high conversions to solid polymer of acceptable molecular weight.

SUMMARY OF THE INVENTION

The invention is directed to the polymerization of vinyl chloride monomer using an acyl sulfonyl peroxide-defined amine initiator system, which initiator system may include a reducing agent, at a temperature below about +20° C. to obtain solid homopolymer.

Any acyl sulfonyl peroxide may be used in the process of the invention. Desirably, the acyl sulfonyl peroxide used has the formula:

(I). 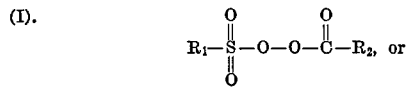

(II). 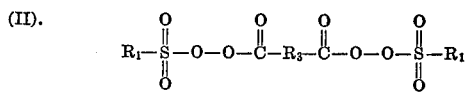

where, (i). $R_1$ and $R_2$ are each selected from the class consisting of alkyl, cycloalkyl, aralkyl and aryl, with each of the aforesaid radicals having not more than 20 carbon atoms; each of the aforesaid radicals may be substituted by lower acyloxy, lower alkoxy, lower alkoxycarbonyl, azido, carboxy, cyano, halo, or sulfo.

(ii). In addition to being any one of the radicals listed above, $R_2$ may be lower alkoxy.

(iii). $R_3$ is alkylene having 1–10, and usually 2–4, carbon atoms.

The amine used in the process of the invention has the formula:

(III). 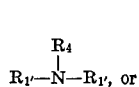    (IV). 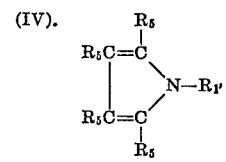

where, (i). $R_1'$ has the same definition as $R_1$ except that any one of the defined alkyl, cycloalkyl, aralkyl and aryl radicals may also have a hydroxy substituent.

(ii). $R_4$ is selected from the class consisting of aryl and aryl substituted by lower acyloxy, lower alkoxy, lower alkoxycarbonyl, azido, carboxy, cyano, halo, sulfo, or hydroxy. Desirably aryl or aryl nucleus has not more than 20 carbon atoms, and usually not more than 10 carbon atoms.

(iii). $R_5$ is H, lower alkyl, lower acyloxy, lower alkoxy, lower alkoxycarbonyl, azido, carboxy, cyano, halo, sulfo, or hydroxy.

The 2 or 3 components of the initiator system used in the process of the invention are charged to the polymerization zone, in parts by weight per 100 parts by weight of vinyl chloride monomer: acyl sulfonyl peroxide, about 0.05–4; defined amine, about 0.01–0.5; and reducing agent, not more than about 2, i.e., between zero (no reducing agent present) and about 2.

Preferred acyl sulfonyl peroxides are lower acyl loweralkylsulfonyl peroxide and lower acyl cycloalkylsulfonyl peroxide.

Preferred amines are N,N-di-lower alkylaniline, N,N-di-lower alkylaminobenzoic acid, and N-lower alkyl pyrrole.

DESCRIPTION OF THE INVENTION
AND WORKING EXAMPLES

The process of the invention is directed to homopolymerization of vinyl chloride monomer by suspension, bulk, or solution procedures.

The process of the invention is carried out at a temperature below about +20° C. If low polymerization rates are acceptable, very low temperatures, e.g., −80° C., may be used. In general, the process is carried out within the temperature range of about −30° C. and about +20° C.

When using suspension polymerization and operating at below about 0° C., it is necessary to use an "antifreeze" in conjunction with the aqueous medium. Conventional antifreezes for this purpose are inorganic salts, such as sodium chloride and potassium chloride, and water soluble organic compounds, such as methanol, ethanol, acetone, ethylene glycol and propylene glycol.

When $R_1$ and $R_2$ are hydrocarbon radicals, the acyl sulfonyl peroxides are insoluble in water and in aliphatic hydrocarbons, and are soluble in aromatic hydrocarbons, ethers, alcohols and aliphatic esters. Some are solids; some are dense, oily liquids.

$R_1$, $R_2$, and also $R_1'$ have not more than 20 carbon atoms in the alkyl, cycloalkyl, aralkyl or aryl radical, and usually not more than 10 carbon atoms. Because these radicals must have at least one carbon atom, the carbon atom content may be expressed as 1–20 and 1–10, respectively. It is to be understood that the foregoing carbon atom content does not include the carbon atoms which may be present in one of the listed substituents.

Alkyl may be primary, secondary, or tertiary. Illustrative alkyl radicals are methyl, ethyl, isopropyl, n-butyl, sec-butyl, isobutyl, t-butyl, sec-pentyl, t-pentyl, sec-hexyl, sec-heptyl, octyl, decyl, dodecyl, hexadecyl, and eiscosyl.

Cycloalkyl, aralkyl, and aryl may be a single ring or a fused ring and the ring may be substituted by alkyl, cycloalkyl, or aryl groups; such substituents are counted as a part of the defined carbon atom content of the radical.

Illustrative cycoalkyls are cyclopropyl, methylcyclopro-ply, cyclopentyl, methylcyclopentyl, cyclohexyl, methylcyclohexyl, ethylcyclohexyl, t-butylcyclohexyl, cycooctyl, and decalyl. Illustrative aralkyls are benzyl, phenethyl, cumyl, xylylethyl, naphthenylisopropyl, and biphenylmethyl. Illustrative aryls are phenyl, xylyl, naphthenyl, methylnaphthenyl, biphenylyl and t-butylphenyl.

Preferred acyl sulfonyl peroxides have the formula:

(V)
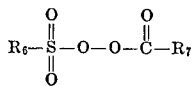

where (a) $R_6$ and $R_7$ are each selected from the class consisting of alkyl, cycloalkyl, aralkyl, aryl and the haloradicals of each of the foregoing radicals with each radical having not more than 10 carbon atoms; and (b) $R_7$ may also be lower alkoxy.

The preferred amine has the formula:

(VI)

or (VII)
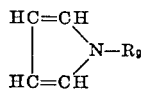

where, (a) $R_8$ is aryl or aryl substituted by carboxy, cyano, halo, or hydroxy and said aryl or aryl nucleus has not more than 10 carbon atoms; and (b) $R_9$ is alkyl, cycloalkyl, aralkyl, aryl, each of the foregoing radicals having not more than 10 carbon atoms, or the corresponding radical substituted by carboxy, cyano, halo, or hydroxy.

Amines of especial interest are N,N-dimethylaniline, N,N-dimethylaminobenzoic acid, N-methylpyrrole, N-phenylpyrrole, (N-ethylanilino)propionitrile, and (N-ethylanilino)ethanol.

It is to be understood that the term "amine" includes the salts formed by amine and mineral acid (not including HI), carboxylic acid, and sulfonic acid. Also the alkali metal nad alkaline earth metal salts of amines substituted by carboxy or sulfo.

Any reducing agent which does not interfere with the polymerization reaction may be used. A partial listing of classes of reducing agents and reducing compounds is: reducing carbohydrates; such as ascorbic acid and glucose; bisulfitealdehyde addition compounds, such as alkali metal formaldehyde sufloxylate; sulfinic acid and metal salts thereof; sulfurous acid and metal salts thereof; di-lower alkyl sulfite; formic acid; lower alkyl formate; lower alkane aldehyde and dialdehyde (lower alkanal and lower alkanedial); acyloin, such as acetol; phosphorous acid and metal salts thereof; tri-lower alkyl phosphite; lower alkyl nitrite; metal arsenite; di-lower alkyl sulfoxide; tri-lower alkyl orthoformate; and lower acetals.

The initiator system used in the process of the invention is composed of the defined peroxide, the defined amine, and the reducing agent, if any is present. The term "composed of" does not require that the 2 or 3 components be premixed or even charged simultaneously to the reactor. Usually, they are charged separately.

Each component of the initiator system is charged to the polymerization zone in a hereinafter set out amount; the relative proportions are affected by the particular compounds being used; the desired rate of reaction at the particular temperature being used; the temperature itself—all this is essentially as is done in operations of prior art processes.

In the following listing there is given the general range and commonly used range of the three components of the initiator system, in weight parts per 100 weight parts of vinyl chloride monomer, charged to the polymerization zone.

| Component | General range | Commonly used |
|---|---|---|
| Peroxide | 0.05–4 | 0.2–2 |
| Reducing agent, when present | 0.01–2 | 0.05–1 |
| Amine | 0.01–0.5 | 0.02–0.3 |

WORKING EXAMPLES

The following working examples and comparative tests are concerned with the suspension polymerization of vinyl chloride monomer to obtain solid homopolymer. It is to be understood that these examples do not limit the scope of the invention.

A standard procedure for evaluation was employed as follows: 325 ml. clear "pop" bottles were used as the reactors. The test began with the addition of the desired amount of the particular amine and reducing agent to the bottle. Then 125 g. of aqueous suspension medium was added to the bottle; the standard medium had the following composition:

|  | G. |
|---|---|
| Water, triple distilled | 95 |
| Sodium chloride | 10 |
| Methocel, 1% aqueous solution [1] | 10 |
| Span 60, 1% aqueous solution [2] | 5 |
| Tween 60, 1% aqueous solution [3] | 5 |

[1] Methylcellulose.
[2] Sorbitan monostearate.
[3] Polyethylene glycol ether of sorbitan monostearate.

The bottle was then subjected to a temperature on the order of −20° C. to −30° C. until the contents were frozen. 10 g. of distilled water was then added and this cooled until frozen. Then the desired amount of peroxide was added to the bottle; 50 g. of vinyl chloride monomer was then charged to the bottle. The vinyl chloride was added at about −15° C. The bottle was then crown-capped using an inert seal. The bottle was enclosed in a safety cage. If the polymerization was to be started within 2–3 hours after sealing the bottle, it was stored at about −30° C. until the test was to begin. If a longer holding time was needed, the sealed bottle was stored at −80° C. Under these conditions of holding, no polymerization takes place during the holding period.

When the polymerization was to begin, the bottle in its safety cage was placed in a tumbling device immersed in a constant temperature bath. The bottle was tumbled at 25 revolutions per minute for the desired time of reaction. At the time desired, the bottle was removed from the bath and taken out of its safety cage. The bottle was held at 0° C. while vinyl chloride monomer was vented through the cap of the bottle by use of a syringe needle. The venting operation was controlled so as to avoid further polymerization of monomer—usually about 15 minutes total time.

The standard procedure has been described for one bottle. However, in each test a number of bottles were prepared in order to have duplicates and also to permit the course of the reaction to be followed, when so desired, by removing a bottle at certain times during the total reaction time.

Unless stated otherwise the standard time was 16 hours and the standard temperature was 0° C. in the following examples.

In the tests, to permit easy comparison, the peroxide, the amine, and reducing agent are each given in "mole" per 100 grams of vinyl chloride monomer charged. To give more manageable numbers, in all instances the molar amount is given as (amount) $\times 10^{-3}$ mole. In one example the acetyl t-butyl-sulfonylperoxide/ascorbic acid/ N,N-dimethylaniline molar proportion was 5/2.5/0.5 with each number to be "$\times 10^{-3}$" per 100 g. of monomer. This molar proportion converts to weight parts of 1/0.44/ 0.06 per 100 weight parts of monomer.

In another example, the molar proportion of acetyl cyclohexyl sulfonyl peroxide/ascorbic acid/4-dimethyl-aminobenzoic acid was 5/2.5/0.5 (each number "$\times 10^{-3}$") per 100 g. of monomer. This converts to weight parts of 1.1/0.44/0.08 per 100 weight parts of monomer.

EXAMPLE 1

Polymerization using peroxide alone or peroxide/amine

In this example, two acyl sulfonyl peroxides and several amines were tested, in the absence of reducing agent, for effectiveness in suspension polymerization of vinyl chloride using the standard procedure. In all tests $5 \times 10^{-3}$ mole of peroxide was used per 100 g. of vinyl chloride charged. When used, the amine was used in an amount of $0.5 \times 10^{-3}$ mole per 100 g. of vinyl chloride charged.

Series A: Acetyl t-butylsulfonyl peroxide
Series B: Acetyl t-pentylsulfonyl peroxide

| Amine | Conversion, percent | |
|---|---|---|
| | Series A | Series B |
| None | 30 | 42 |
| N,N-dimethylaniline | 82 | |
| N,N-dimethylaniline.HCl | 83 | |
| N,N-diethylaniline | 82 | |
| N,N-diethylaniline.HCl | 82 | |
| 4-dimethylaminobenzoic acid | 83 | 94 |
| 4-dimethylaminobenzoic acid.HCl | 62 | |
| 4-dimethylaminobenzoate, Na | 76 | 88 |
| 3-dimethylaminobenzoic acid | 81 | |
| 3-dimethylaminobenzoate, Na | 73 | |
| 3-dimethylaminobenzoic acid.HCl | 77 | |

The above shows that in all tests the presence of amine increases conversion by at least 100% based on the "no amine" present test.

EXAMPLE 2

Effect of amine and/or reducing agent present at constant peroxide usage

Peroxide: Acetyl t-butylsulfonyl peroxide
Reducing agent: Ascorbic acid
Amine: N,N-dimethylaniline

| Amount $\times 10^{-3}$ mole | | | Conversion, percent |
|---|---|---|---|
| Peroxide | Reducing agent | Amine | |
| 5.0 | None | None | 30 |
| 5.0 | 2.5 | 0.5 | 92 |
| 5.0 | None | 0.5 | 83 |
| 5.0 | None | 3.0 | 81 |
| 5.0 | None | 5.5 | 65 |
| 5.0 | 2.5 | None | 68 |
| 5.0 | 2.8 | None | 79 |
| 5.0 | 3.0 | None | 78 |

The above shows that an increase in conversion, over peroxide alone, is obtained by the presence of amine or reducing agent. However, the above also shows that the peroxide/amine and the peroxide/reducing agent systems each reach a maximum conversion. The use of the 3 component system causes the conversion to leap ahead of that maximum, indicating that the amine and reducing agent together act in a manner different from their action when alone. (The drop in conversion with a large amount of amine present appears to be a characteristic of the acyl sulfonyl peroxide/amine system.)

EXAMPLE 3

Effect of the type of peroxide present in the initiator system

In this example various peroxides including acyl sulfonyl peroxides as defined and other organic peroxides were tested for effectiveness in polymerizing vinyl chloride monomer at 0° C. and 16 hours time, using the standard suspension procedure. One series of tests was carried out using the peroxide alone; another series of tests used an initiator system of peroxide, 4-dimethylamino-benzoic acid, and ascorbic acid or peroxide, ascorbic acid and N,N-dimethaniline hydrochloride.

| | Conversion, percent | |
|---|---|---|
| Peroxide present | Peroxide only | Reducing peroxide, agent and amine |
| Acetyl sec-butylsulfonyl | | 89 (2) |
| Acetyl t-butylsulfonyl | 30 | 92 (1) |
| Acetyl 3-chloro-1-methylpropylsulfonyl | 11 | 96 (2) |
| Acetyl t-pentylsulfonyl | 42 | 98 (1) |
| Acetyl cyclopentylsulfonyl | 2 | 98 (1) |
| Acetyl 1-methylcyclopentylsulfonyl | | 93 (2) |
| Acetyl cyclohexylsulfonyl | 4 | 96 (1) |
| Acetyl 1-methylcyclohexylsulfonyl | 42 | 96 (1) |
| Propionyl cyclohexylsulfonyl | 14 | 94 (2) |
| Diisobutyryl | 29 | 5 (1) |
| Methyl ethyl ketone peroxide | 0 | 14 (2) |

(1) Peroxide/Ascorbic acid/4-dimethylaminobenzoic acid in molar amounts of 5/2.5/0.5, each $\times 10^{-3}$ per 100 g. of monomer.
(2) Peroxide/ascorbic acid/N,N-dimethylaniline hydrochloride in molar amounts as in (1).

At standard test procedure conditions certain peroxides showed no ability to initiate the reaction alone; and derived little or no benefit from the presence of amine/ reducing agent. These peroxides are: t-butyl p-toluene-peroxysulfonate; dibenzoyl peroxide; t-butyl peroxybenzoate; hydrogen peroxide; di-t-butyl peroxide; diisopropyl peroxydicarbonate; and OO-t-butyl O-isopropyl monoperoxycarbonate.

The above tests show that only the defined sulfonyl peroxides are favorably influenced by the presence of amine and amine/reducing agent. The effect on the conversion of the acyl alkylsulfonyl and acyl cycloalkylsulfonyl peroxides is dramatic.

It is pointed out that propionyl cyclohexylsulfonyl peroxide is an inefficient peroxide compared to acetyl alkyl and acetyl cycloalkyl sulfonyl peroxides at temperatures of about +30° C.; but at the lower temperatures of this process, in the presence of amine and amine/ reducing agent, this peroxide is essentially as efficient as the best of the sulfonyl peroxides.

EXAMPLE 4

Effect of the type of amine present

In this example various amines were tested in the standard procedure. In all the tests the peroxide was acetyl t-butylsulfonyl peroxide and the reducing agent was ascorbic acid. The peroxide was present in an amount of $5.0 \times 10^{-3}$ mole, except as noted; the ascorbic acid was present in an amount of $2.5 \times 10^{-3}$ mole; the amine or amine·HCl was present in an amount of $0.5 \times 10^{-3}$ mole— all per 100 g. of vinyl chloride monomer.

|  | Conversion, percent | |
|---|---|---|
|  | Amine | Amine·HCl |
| Amine within the definition: |  |  |
| N,N-dimethylaniline | 95 | 94 |
| N,N-diethylaniline |  | 95 |
| N,N-dibenzylaniline (1) | 91 | 89 |
| Triphenylamine |  | 97 |
| 4-N,N-dimethylaminobenzoic acid | 95 | 97 |
| 3-N,N-dimethylaminobenzoic acid | 97 | 97 |
| 3-(N-ethylanilino)propionitrile (1) | 91 | 94 |
| 2-(N-ethylanilino)ethanol |  | 94 |
| 4-N,N-dimethylaminobenzonitrile (1) | 93 | 94 |
| 3-N,N-dimethylaminophenol |  | 97 |
| N-ethylcarbazole |  | 96 |
| N-methylpyrrole |  | 96 |
| N-phenylpyrrole |  | 92 |
| Amine outside the definition: |  |  |
| Pyridine |  | 84 |
| 2-N,N-dimethylaminopyridine |  | 83 |
| N-methylaniline | 81 | 82 |
| p-Toluidine | 68 | 75 |
| Triethylamine | 73 | 76 |
| N,N-dimethylisobutenylamine | 76 | 75 |

(1) Peroxide: $2.5 \times 10^{-3}$ mole per 100 g. vinyl chloride.

The amines outside the definition show no significant benefit from the presence of reducing agent in the polymerization zone.

EXAMPLE 5

Effect of the type of reducing agent present

In this example various reducing agents were tested in the standard procedure. In all tests the peroxide was: acetyl t-butylsulfonyl peroxide, $5.0 \times 10^{-3}$ mole; the amine when used was 4-N,N-dimethylaminobenzoic acid, $0.5 \times 10^{-3}$ mole; the reducing agent was present in an amount of $2.5 \times 10^{-3}$ mole—all amounts per 100 g. of vinyl chloride.

|  | Conversion, percent | |
|---|---|---|
| Reducing agent | Peroxide plus reducing agent (no amine) | Peroxide plus reducing agent plus amine |
| Ascorbic acid | 68 | 98 |
| Benzenesulfinic acid | 71 | 99 |
| Sodium benzenesulfinate | 50 | 98 |
| Sodium formaldehyde sulfoxylate | 76 | 98 |
| Sodium arsenite | 53 | 93 |
| Sodium bisulfite | 67 | 92 |
| Sodium sulfite | 72 | 99 |
| Diethyl sulfite | 41 | 95 |
| Sodium meta-bisulfite | 68 | 99 |
| Isopentyl nitrite | 0 | 90 |
| Triisopropyl phosphite | 44 | 93 |
| Formic acid | 42 | 98 |
| sec-Butyl formate | 45 | 97 |
| Triisodecyl orthoformate | 46 | 96 |
| n-Heptanaldehyde | 38 | 95 |
| Dimethoxy methane | 48 | 95 |
| Acetol | 44 | 98 |
| Dimethyl sulfoxide | 45 | 95 |

These data show the advantage to be gained by the use of amine in connection with the reducing agent. It is worth pointing out that the presence of amine pushed conversion to practical completion, regardless of the level of conversion of the particular reducing agent. (This peroxide alone at these conditions gives 30% conversion—Example 1.)

EXAMPLE 6

Molecular weights of vinyl chloride homopolymers

The number average molecular weights of several vinyl chloride homopolymers was determined from the Mark-Houwink-Sakurada equation: J. Brandrup and E. H. Immergut, "Polymer Handbook, Sections IV–2 and 15," Interscience Publishers, 1966. These homopolymers were obtained using the standard procedure, except for temperature. Acetyl t-butylsulfonyl peroxide, $5 \times 10^{-3}$ mole; 4-N,N-dimethylaminobenzoic acid, $0.5 \times 10^{-3}$ mole; and reducing agent, $2.5 \times 10^{-3}$ mole—each per 100 g. monomer—were used in the initiator system.

| Reducing agent | Temp., °C. | Conversion, percent | Molecular weight |
|---|---|---|---|
| Ascorbic acid | 0 | 93 | 117,000 |
| Sodium formaldehyde sulfoxylate | 0 | 98 | 101,000 |
| Benzenesulfinic acid | 0 | 99 | 90,000 |
| Benzenesulfinic acid | −10 | 60 | 138,000 |

For comparison purposes, a test was carried out at +30° C. using acetyl t-butylsulfonyl peroxide alone, $0.4 \times 10^{-3}$ mole per 100 g. of monomer. This test gave 90% conversion of homopolymer having a 95,000 molecular weight. (It is pointed out that vinyl chloride homopolymers now being sold commercially have number average molecular weights on the order of 50,000.)

EXAMPLE 7

A comparison was made between the 3-component initiator system of this invention and of the initiator system disclosed in British Patent No. 1,021,966. In the patent, acetyl cyclohexylsulfonyl peroxide is used in conjunction with ferrous sulfate and another reducing agent. The comparison tests were run according to the standard procedure using acetyl cyclohexylsulfonyl peroxide, ascorbic acid, ferrous sulfate and 4-N,N-dimethylaminobenzoic acid. The amounts used were similar to those of this invention for ascorbic acid and amine, respectively. In the tables below, all amounts, except conversion, must be multiplied by $10^{-3}$ to obtain mole per 100 g. of vinyl chloride.

A. 3-COMPONENT SYSTEM OF THIS INVENTION

| Peroxide | Ascorbic acid | Amine | Conversion, percent |
|---|---|---|---|
| 1.0 | 2.5 | 0.5 | 80 |
| 2.0 | 2.5 | 0.5 | 95 |
| 3.0 | 2.5 | 0.5 | 96 |

B. BRITISH PATENT INITIATOR SYSTEM

| Peroxide | Ascorbic acid | Ferrous sulfate | Conversion, percent |
|---|---|---|---|
| 3.0 | 2.5 | 0.5 | 61 |
| 5.0 | 2.5 | 0.5 | 82 |

The above shows that the peroxide/amine/ascorbic acid initiator system of the process of this invention gives a conversion equivalent to that obtained with the peroxide/dual-reducing agent initiator system of the British patent, while using only one-fifth the amount of peroxide.

Thus having described the invention, what is claimed is:

1. In the homopolymerization of vinyl chloride monomer by suspension, solution, or bulk procedures, using an organic peroxide initiator, at a temperature below about +20° C. to obtain a solid polymer, the improvement which consists of using an initiator system composed of:

(a) acyl sulfonyl peroxide in an amount of about 0.05–4 weight parts per 100 weight parts of monomer;

(b) amine in an amount of about 0.01–0.5 weight parts per 100 weight parts of monomer, said amine having the formula (III)

$$R_1'-\underset{\underset{R_4}{|}}{N}-R_1'$$

or (IV)

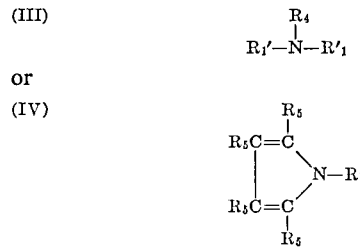

where, (i) $R'_1$ is a radical selected from the class consisting of alkyl, cycloalkyl, aralkyl, and aryl, each of said foregoing radicals having not more than 20 carbon atoms, and the corresponding foregoing radical substituted by lower acyloxy, lower alkoxy, lower alkoxycarbonyl, azido, carboxy, cyano, halo, sulfo, or hydroxy;
(ii) $R_4$ is aryl or aryl substituted by lower acyloxy, lower alkoxy, lower alkoxycarbonyl, azido, carboxy, cyano, halo, sulfo, or hydroxy; and
(iii) $R_5$ is H, lower alkyl, lower acyloxy, lower alkoxy, lower alkoxycarbonyl, azido, carboxy, cyano, halo, sulfo, or hydroxy; and
(c) reducing agent in an amount of not more than 2 weight parts per 100 weight parts of monomer.

2. The process of claim 1 wherein said sulfonyl peroxide is acetyl t-butylsulfonyl peroxide.
3. The process of claim 1 wherein said sulfonyl peroxide is acetyl t-pentylsulfonyl peroxide.
4. The process of claim 1 wherein said sulfonyl peroxide is acetyl cyclohexylsulfonyl peroxide.
5. The process of claim 1 wherein said sulfonyl peroxide is acetyl 1-methylcyclohexylsulfonyl peroxide.
6. The process of claim 1 wherein said amine is N,N-di-lower alkylaniline.
7. The process of claim 6 wherein said amine is N,N-dimethylaniline.
8. The process of claim 1 wherein said amine is N-lower alkylpyrrole.
9. The process of claim 8 wherein said amine is N-methylpyrrole.
10. The process of claim 1 wherein said amine is N-phenylpyrrole.
11. The process of claim 1 wherein said amine is N,N-di-lower alkylaminobenzoic acid.
12. The process of claim 11 wherein said amine is 4-N,N-dimethylaminobenzoic acid.
13. The process of claim 1 wherein said sulfonyl peroxide has the formula (I) 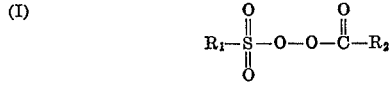

or (II) 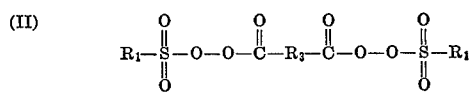

where (i) $R_1$ and $R_2$ are each selected from the class consisting of alkyl, cycloalkyl, aralkyl, and aryl, each of said foregoing radicals having not more than 20 carbon atoms, and the corresponding foregoing radical substituted by lower acyloxy, lower alkoxy, lower alkoxycarbonyl, azido, carboxy, cyano, halo, or sulfo;
(ii) also $R_2$ may be lower alkoxy; and
(iii) $R_3$ is alkylene having 1–10 carbon atoms.

14. The process of claim 13 wherein $R_1$ and $R_2$ have not more than 10 carbon atoms in said alkyl, cycloalkyl, aralkyl and aryl radicals.
15. The process of claim 1 wherein said reducing agent is present in an amount of about 0.01–2 weight parts per 100 weight parts of monomer and is selected from the class consisting of reducing carbohydrates; bisulfite-aldehyde addition compounds; sulfinic acid and metal salts thereof; sulfurous acid and metal salts thereof; metal meta-bisulfite; lower alkyl sulfite; formic acid; lower alkyl formate; lower alkane aldehyde and dialdehyde; acyloin; phosphorous acid and metal salts thereof; lower alkyl phosphite; lower alkyl nitriate; metal arsenite; di-lower alkyl sulfoxide; lower acetals; and tri-lower alkyl orthoformates.
16. The process of claim 15 wherein said agent is ascorbic acid.
17. The process of claim 15 wherein said agent is sodium sulfite.
18. In the suspension polymerization of vinyl chloride monomer, at a temperature of about +20° C. to about −30° C., using an organic peroxide initiator, to obtain a solid homopolymer, the improvement which consists of using an initiator system composed of:
(1) acyl sulfonyl peroxide having the formula (V) 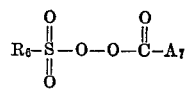

where (a) $R_6$ and $R_7$ are each selected from the class consisting of alkyl, cycloalkyl, aralkyl, aryl and the haloradicals of each of the foregoing, each of said foregoing radicals having not more than 10 carbon atoms; and
(b) also $R_7$ may be lower alkoxy;

(2) amine having the formula (VI) $R_9-\underset{\underset{R_8}{|}}{N}-R_8$ or

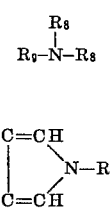

where (a) $R_8$ is aryl having not more than 10 carbon atoms or said aryl substituted by carboxy, cyano, halo, or hydroxy; and
(b) $R_9$ is alkyl, cycloalkyl, aralkyl or aryl, each of said foregoing radicals having not more than 10 carbon atoms, or the corresponding foregoing radical substituted by carboxy, cyano, halo or hydroxy; and (3) reducing agent selected from the class consisting of reducing carbohydrates; bisulfite-aldehyde addition compounds; sulfinic acid and metal salts thereof; sulfurous acid and metal salts thereof; metal metabisulfite; lower alkyl sulfite; formic acid; lower alkyl formate; lower alkane aldehyde and dialdehyde; acyloin; phosphorous acid and metal salts thereof; lower alkyl phosphite; lower alkyl nitrite; metal arsenite; di-lower alkyl sulfoxide; lower acetals; and tri-lower alkyl orthoformates; and (4) said initiator system having present, in weight parts per 100 weight parts of monomer, said sulfonyl peroxide, about 0.2–2; said amine, about 0.02–0.3; and said reducing agent, about 0.05–1.

19. A vinyl chloride suspension polymerization process comprising: charging vinyl chloride monomer, aqueous suspension medium, acetyl t-butylsulfonyl peroxide about 1 part, and N,N-dimethylaniline about 0.06 part, each of said parts being by weight per 100 weights parts of said monomer; maintaining said charge under agitation at about 0° C. for about 16 hours; and recovering solid polyvinyl chloride from said medium.

20. A vinyl chloride suspension polymerization process comprising: charging vinyl chloride monomer, aqueous suspension medium, acetyl t-butylsulfonyl peroxide about 1 part, ascorbic acid about 0.44 part, and N,N-dimethylaniline about 0.06 part, each of said parts being by weight per 100 parts by weight of said monomer; maintaining said charge under agitation at about 0° C. for about 16 hours; and recovering solid polyvinyl chloride from said medium.

21. A vinyl chloride suspension polymerization process comprising: charging vinyl chloride monomer, aqueous suspension medium, acetyl cyclohexylsulfonyl peroxide about 1.1 parts, ascorbic acid about 0.44 part, and 4-dimethylaminobenzoic acid about 0.08 part, each of said parts being by weight per 100 parts by weight of monomer; maintaining said charge under agitation at about 0° C. for about 16 hours; and recovering solid polyvinyl chloride from said medium.

References Cited

FOREIGN PATENTS 1,021,996   3/1966   Great Britain ——————— 260—92.8

JOSEPH L. SCHOFER, Primary Examiner

J. A. DONAHUE, Jr., Assistant Examiner

U.S. Cl. X.R.

260—92.8 W

PO-1050
(5/69)

UNITED STATES PATENT OFFICE
CERTIFICATE OF CORRECTION

Patent No. 3,629,220      Dated Dec. 21, 1971

Inventor(s) Jose Sanchez

It is certified that error appears in the above-identified patent and that said Letters Patent are hereby corrected as shown below:

Column 10, formula (V), that portion of the formula reading "$-A_7$" should read -- $-R_7$ --; formula (VI), that portion of the formula reading "$R_9-N-R_8$" should read -- $R_9-N-R_9$ --; and line 30, -- (VII) -- should be inserted before the formula.

Signed and sealed this 11th day of July 1972.

(SEAL)
Attest:

EDWARD M. FLETCHER, JR.
Attesting Officer

ROBERT GOTTSCHALK
Commissioner of Patents